United States Patent [19]
Nakamura et al.

[11] Patent Number: 5,408,601
[45] Date of Patent: Apr. 18, 1995

[54] GRAPHIC EDITOR

[75] Inventors: Takeo Nakamura; Syuichiro Yamada; Yasuko Yoshida, all of Kawasaki, Japan

[73] Assignee: Fujitsu Limited, Kawasaki, Japan

[21] Appl. No.: 270,325

[22] Filed: Jul. 5, 1994

Related U.S. Application Data

[63] Continuation of Ser. No. 799,332, Nov. 27, 1991, abandoned.

[30] Foreign Application Priority Data

Nov. 29, 1990 [JP] Japan ................ 2-333342

[51] Int. Cl.⁶ ...................... G06F 3/153; G06F 15/60
[52] U.S. Cl. ...................... 395/155; 395/161
[58] Field of Search ............ 395/146, 147, 140, 148, 395/161, 155; 340/709; 364/488, 489, 490

[56] References Cited

U.S. PATENT DOCUMENTS

| | | | |
|---|---|---|---|
| 4,656,603 | 4/1987 | Dunn | 395/161 X |
| 4,686,522 | 8/1987 | Hernandes et al. | 340/709 X |
| 4,813,013 | 3/1989 | Dunn | 395/159 X |
| 4,949,388 | 8/1990 | Bhaskaran | 395/161 X |
| 5,019,961 | 5/1991 | Addesso et al. | 395/161 X |
| 5,140,521 | 8/1992 | Kozol et al. | 395/146 X |

OTHER PUBLICATIONS

Microsoft Windows User's Guide, pp. 8, 29, 34–36, 40–42, 44–45, 54–55.

*Primary Examiner*—Heather R. Herndon
*Assistant Examiner*—Cliff Nguyen Vo
*Attorney, Agent, or Firm*—Staas & Halsey

[57] ABSTRACT

A graphic editor for performing various editing processes such as inputting, moving, copying, and deleting a graphic pattern and a line on a display screen in a graphic editing system such as a CAD, etc. The graphic editor realizes a user interface for simultaneously selecting an object to be processed and a function, thus improving the efficiency of the editing operation. The editor comprises an area specifier for specifying an area as a rectangle having a diagonal whose start and end points are specified by the area specifier, and a graphic operating unit for determining the existence of a symbol or a line in a specified area to give a predetermined process on the symbol or the line. The predetermined processes can be identified by determining whether or not a symbol and/or a whole or a part of a line exists in or crosses a specified area.

14 Claims, 23 Drawing Sheets

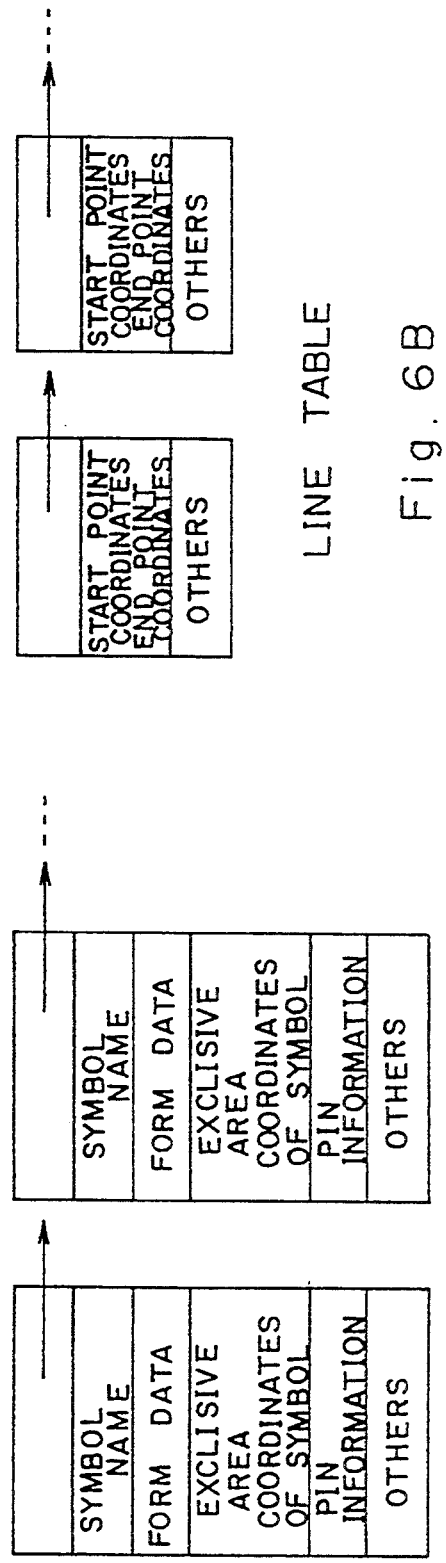

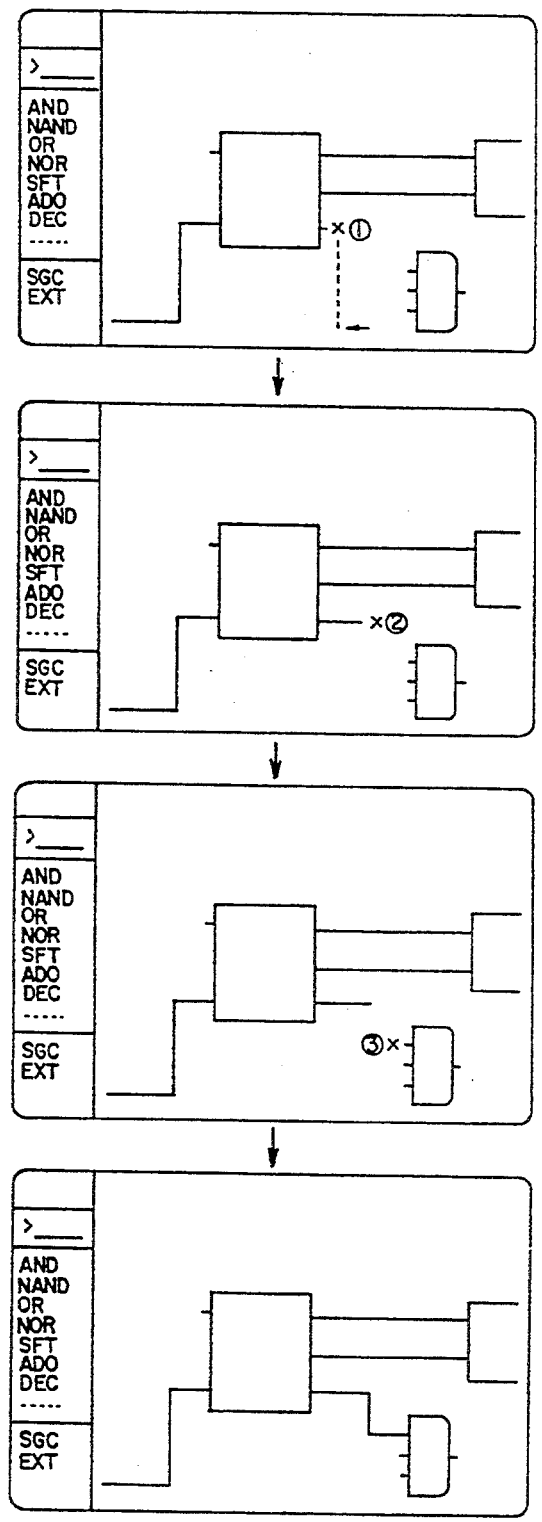
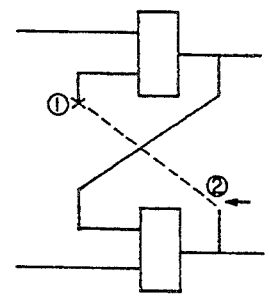
Fig. 9B
Fig. 9A

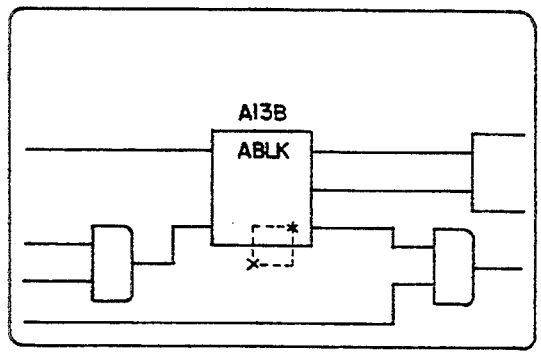
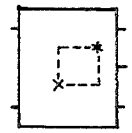
(a-1)
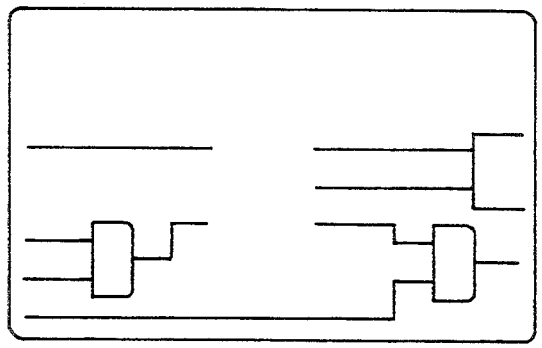
Fig. 10A
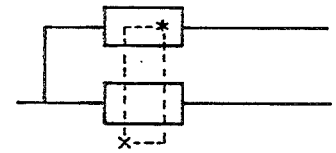
(a-2)
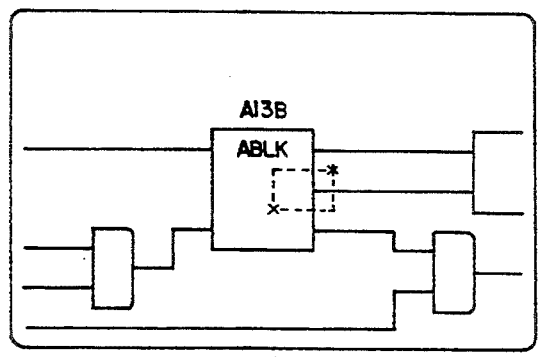
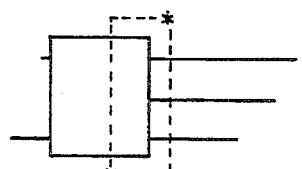
(b-1)
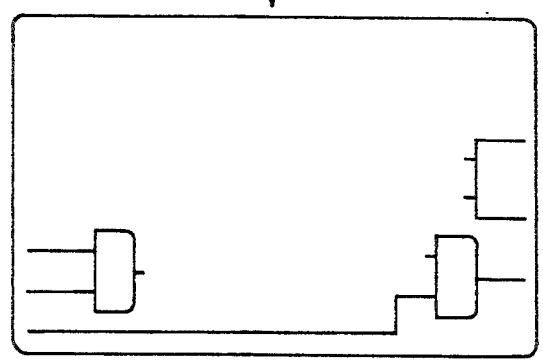
Fig. 10B
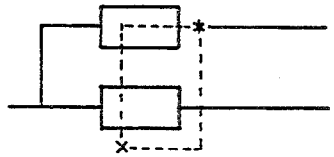
(b-2)

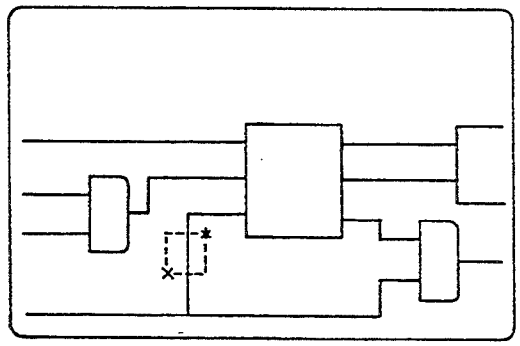
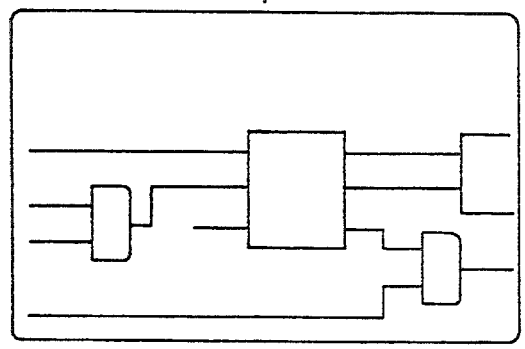
Fig. 10E
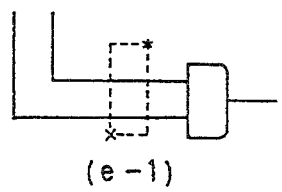
(e-1)
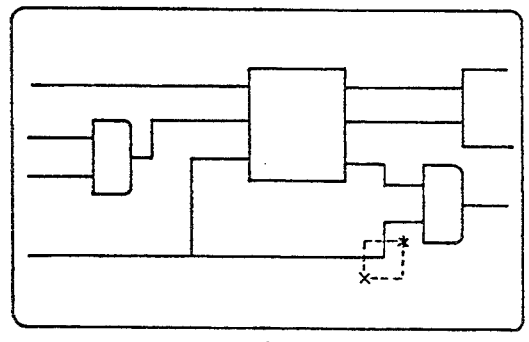
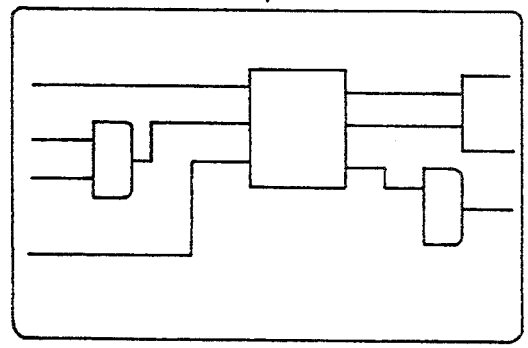
Fig. 10F
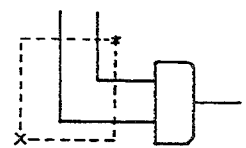
(f-1)

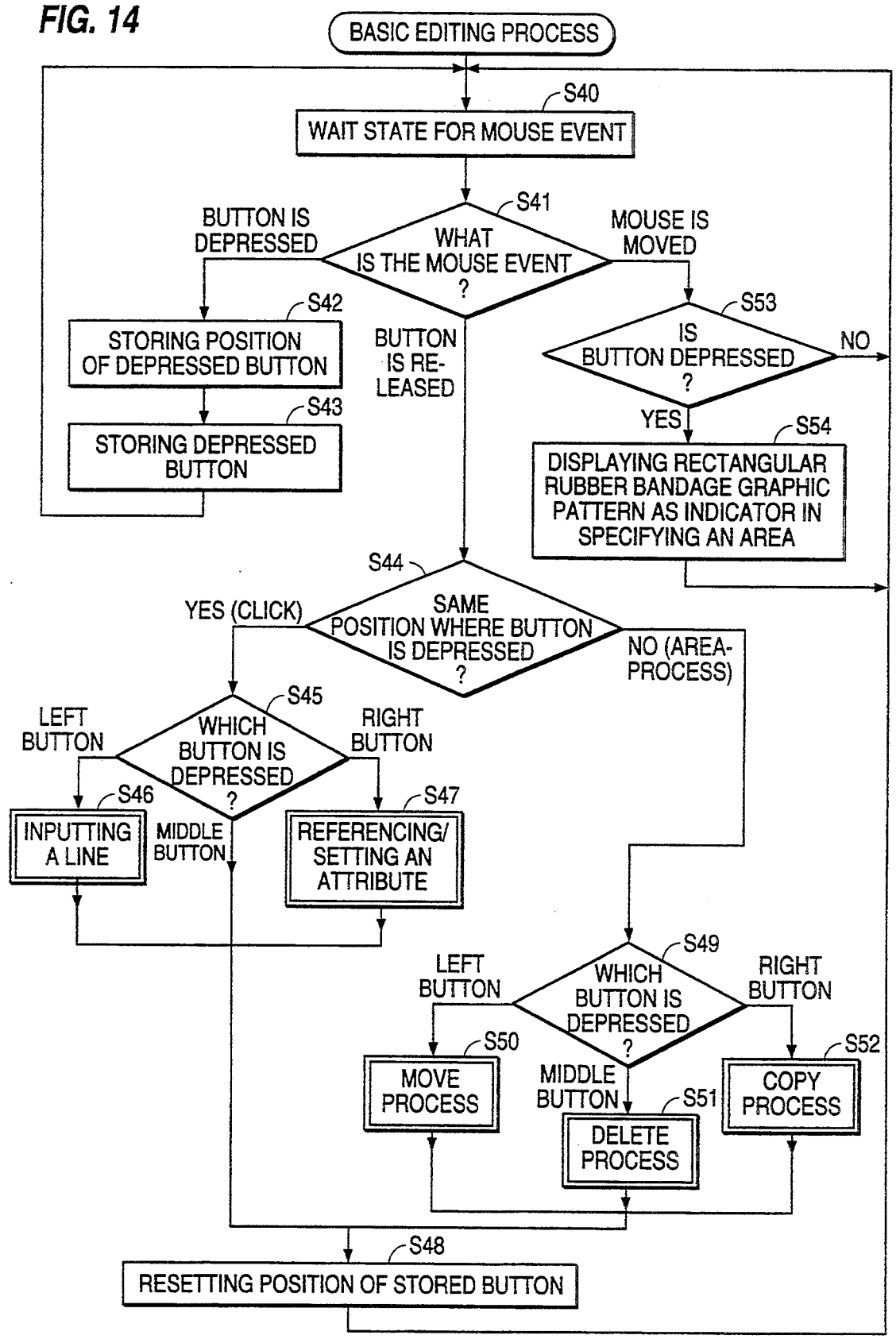

GRAPHIC EDITOR

This application is a continuation of application Ser. No. 07/799,332, filed Nov. 27, 1991, now abandoned.

BACKGROUND OF THE INVENTION

1. Field of the Invention

The present invention relates to a graphic editor for simplifying editing operations such as inputting, moving, copying, and deleting a graphic pattern or a line on a display screen, in a graphic editing system such as a CAD system, etc.

2. Description of the Related Art

Conventionally, a system for editing a functional block diagram or a circuit diagram has functions of inputting and correcting, using a graphic display, a logical element (symbol) and a signal line (line) forming a logical view of a computer. With such a system, a user is required to inform the system of a requested function (a process to be (performed).

The process information (command) of a conventional logical graphic editing system is usually given by inputting a command from a keyboard or by selecting a requested process from a menu displayed on a screen (a fixed menu, pop-up menu displayed when necessary, pull-down menu, etc.). Some commands are issued by depressing a key assigned a function (a function key).

In each case, however, at least two operation steps are required for selecting a function and a process to be performed. For example, a user must specify start and end points of a signal line after Specifying a function such as "a signal line is inputted", etc. Then, considering variations of processes, additional selections must be made.

That is, in the prior art technology, when only a symbol or a symbol and a line are to be deleted, moved, or copied, for example, either a menu or a function button is selected. When a menu is selected, for example, in addition to a selection of deleting, moving, or copying operation, either a symbol only, a line only, or an enclosed area must be specified for a deleting operation, for example. An internal process of a system in response to a selection result requires specification of either a symbol only or a symbol and a line.

Next, as the second step, to specify an object to be processed, a point or an area is specified by repositioning a cursor. As an internal process of a system, the cursor position is determined and the corresponding symbol or both the corresponding symbol and line are deleted. In a word processor, however, the process is performed only on the specified area without determining an area to be processed.

Thus, in the prior art technology, in the process of embodying a logical view in an inventor's brain using a screen, an editing process is divided into Selecting a function and an object to be processed, thus stopping his or her thinking process and reducing its efficiency by requiring double processes.

For example, when the number of symbols adds up to tens or hundreds, the number of processes in editing a graphic pattern (delete/move/copy) may add up to 200 or 300. In a graphic process in a CAD system, etc., a delete and other processes of a symbol and related input/output lines are performed. In the prior art technology, there is a problem that the object to be processed, that is, a symbol and a line must be specified separately.

SUMMARY OF THE INVENTION

An object of the present invention is to realize a user interface for selecting both a function and an object to be processed in basic operations such as inputting, deleting, moving, copying, and setting-an-attribute to improve the efficiency in the graphic editing process.

That is, in the present invention, a user inputs a function by pushing a function-assigned button provided corresponding to a position on a display screen. An object to be processed is determined by a central processing unit (CPU), for example. That is, the central processing unit reads directly an object to be processed according to the position of a symbol and/or a line on the screen; determines, according to the reading result, whether the area to be processed contains only a symbol or both a symbol and a line, and then performs one kind of predetermined operation such as a deleting process. By selecting a function by moving a cursor, the user can have the indicated coordinates read, a symbol and a line identified, and all the processes for a graphic pattern executed automatically.

A feature of the present invention resides in a graphic editor in a graphic editing system for editing graphic patterns shown on a display screen, comprising: an area specifying means for specifying an area on the display screen; and a graphic operating means for determining the existence of a graphic pattern or a line within an area specifier by the area specifying means, and for performing a specified operation on a graphic pattern or a line in the area or on the boundary of the area.

BRIEF DESCRIPTION OF THE DRAWINGS

FIGS. 6A and 6B show an embodiment of a symbol table and a line table;

FIGS. 9A and 9B show an embodiment for executing a line input operation;

FIG. 14 shows an example of a flowchart of a process embodiment of a basic editing process;

DETAILED DESCRIPTION OF THE PREFERRED EMBODIMENT

Figure 1:
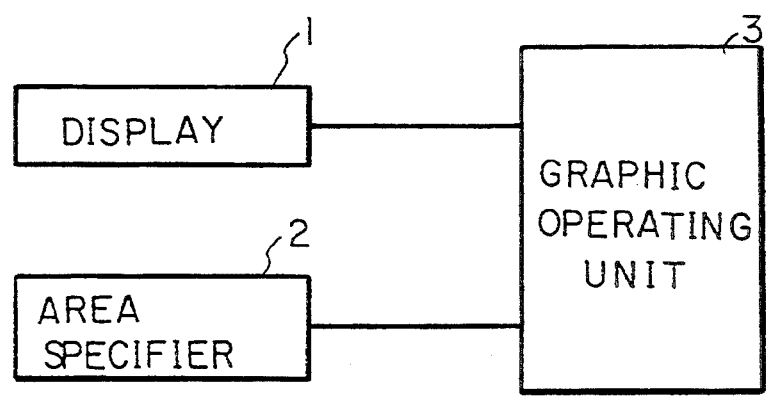
FIG. 1 is a block diagram for explaining the principle of the present invention.

FIG. 1 is a block diagram for explaining the principle of the present invention, i.e. the principle of a graphic editor in the graphic editing system for editing a graphic pattern displayed on the screen of display 1. In FIG. 1, the area specifier 2 can be a mouse, for example, which specifies an area on the screen of display 1 by designating its start and end points. The area is specified as a rectangle with a diagonal line having the above described start and end points. Graphic operating unit 3 determines the existence of a graphic pattern or a line within a specified area by area specifier 2, and performs predetermined operations such as deleting, moving, copying, etc. on the graphic pattern or on a line.

In the present invention, a plurality of mouse buttons which form an area specifier correspond one-to-one to basic operations such as a line inputting operation for a signal line and an attribute reference referencing/setting command, and set commands for a logical element and a signal line, etc.

A user operates mouse buttons when clicking a button and specifying an area to be processed. In the clicking operation where a button is released on a certain position on the display screen without moving a cursor, a basic process is performed corresponding to the button with which the click operation was performed.

For example, when a button is used for a line input function and a cursor is located on the start position of a line, the start point is specified by clicking the button, and the system waits for an input of an end point or an intermediate point. It is predetermined that an end point must reference to the position of a logical element pin, for example. When the click operation is performed again at a pin position using the same button, a line is inputted from the start point to the end point.

On the other hand, when an area is specified by moving a cursor with one of a plurality of buttons depressed, and releasing the button after the cursor has been moved, a basic process is performed on the specified area corresponding to the button. In this case, an object to be processed by the basic operation is to be specified. For example, a symbol (logical element) and a line is moved, deleted, etc.

For example, when the user specification contains an internal part of a symbol or boundary, or crosses a line indicating a signal line, a basic process such as a deleting operation is performed only on the symbol or the line. When the specification contains the boundary of a symbol and a part of a line connected to the symbol, a basic process is performed on the symbol that is totally or partially contained in the specification and on all the lines connected to the symbol. When the specification contains one or more symbols and crosses one or more lines only, a basic process is performed on the specified area. Therefore, a symbol can be deleted by specifying only a part of the boundary of a symbol indicating a logical element.

Thus, in the present invention, a user can edit a graphic pattern only by selecting a function. For example, the number of operating steps performed by a user can be reduced in the graphic editing process.

Figure 2:
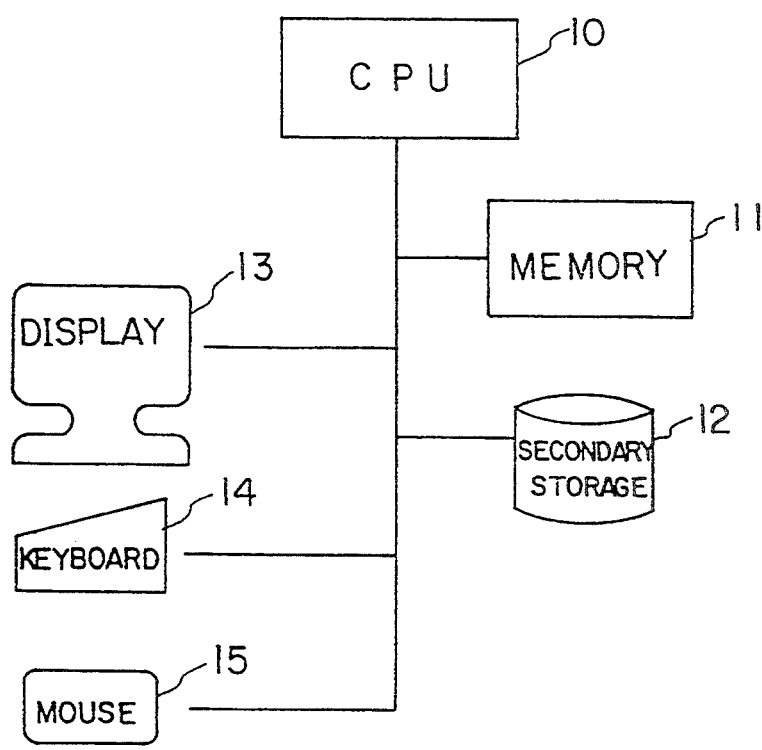
FIG. 2 is a block diagram for explaining a total system configuration of a logical graphic editor to which the present invention is applied.

FIG. 2 shows a block diagram for explaining the total system configuration of a logical graphic editor of the present invention. In FIG. 2, the system comprises a central processing unit (CPU) 10 for controlling the whole system, a memory 11 for storing a program, a data secondary storage unit 12 for storing a library and circuit diagram data base, a display 13, a keyboard 14, and a mouse 15 corresponding to the area specifier 2 described in association with FIG. 1.

Figure 3:
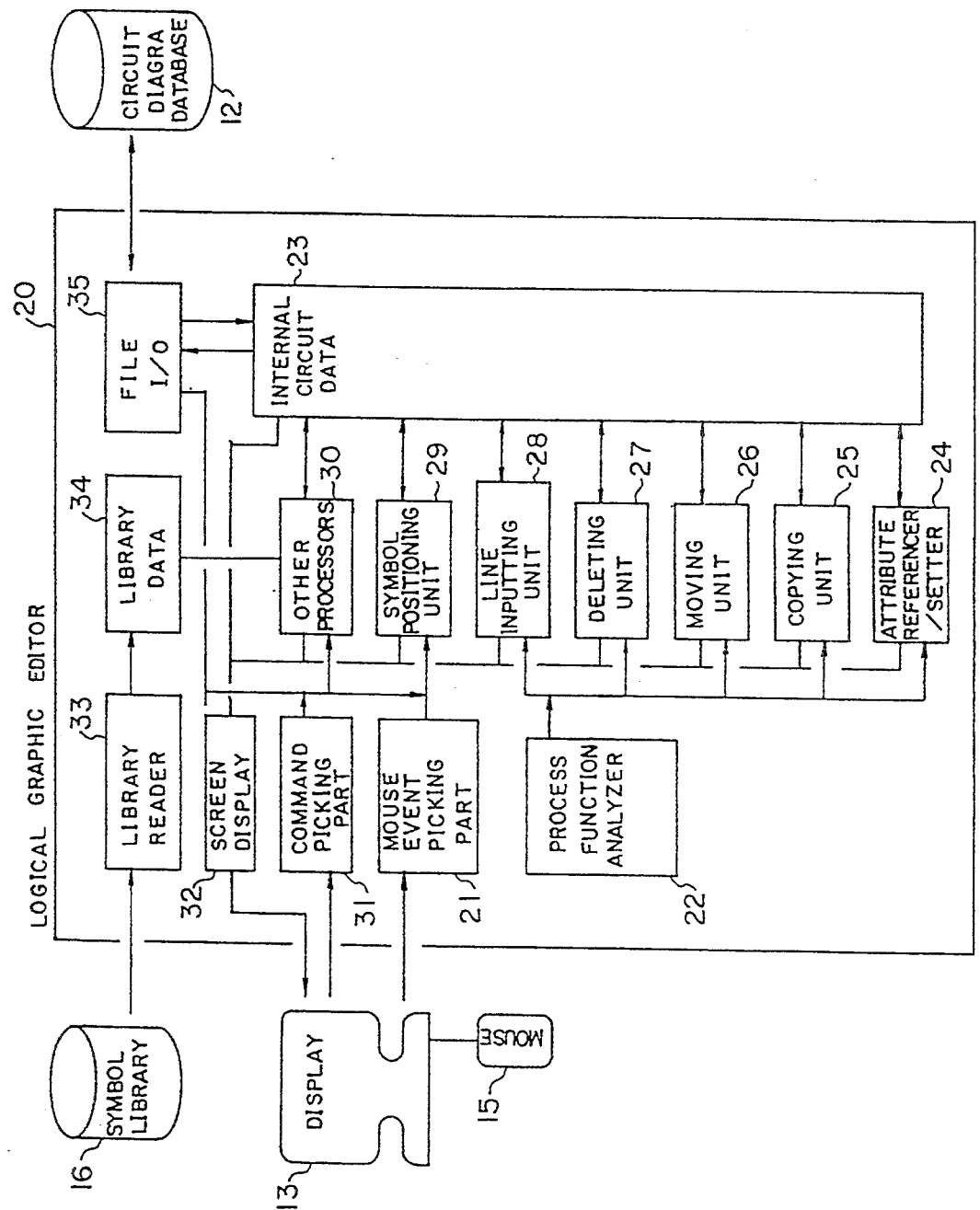
FIG. 3 is a block diagram for explaining a configuration of an embodiment of a logical graphic editor of the present invention.

FIG. 3 is a block diagram for explaining the configuration of an embodiment of a logical graphic editor of the present invention. In FIG. 3, an editor 20 comprises a mouse event picking unit 21 for picking a mouse event such as a clicking of a button, moving a mouse, etc., a process function analyzer 22 for determining a necessary process as described in association with FIG. 22, an attribute referencer/setter 24 for processing internal circuit data 23, a copying unit 25, a moving unit 26, a deleting unit 27, a line inputting unit 28, a symbol positioning unit 29, and other processing units 30.

It also comprises a command picking unit 31 for picking a command from a display 13, a screen display 32 for displaying a screen of display 13, a library reader 33 for reading the contents of a library from symbol library 16, a library data unit 34 for storing the contents of the library, and an I/O file 35. The features of the configuration of the present invention resides in the mouse event picking unit 21 and the process function analyzer 22, other parts of the configuration being the same as those of the prior art technology.

Figure 4:
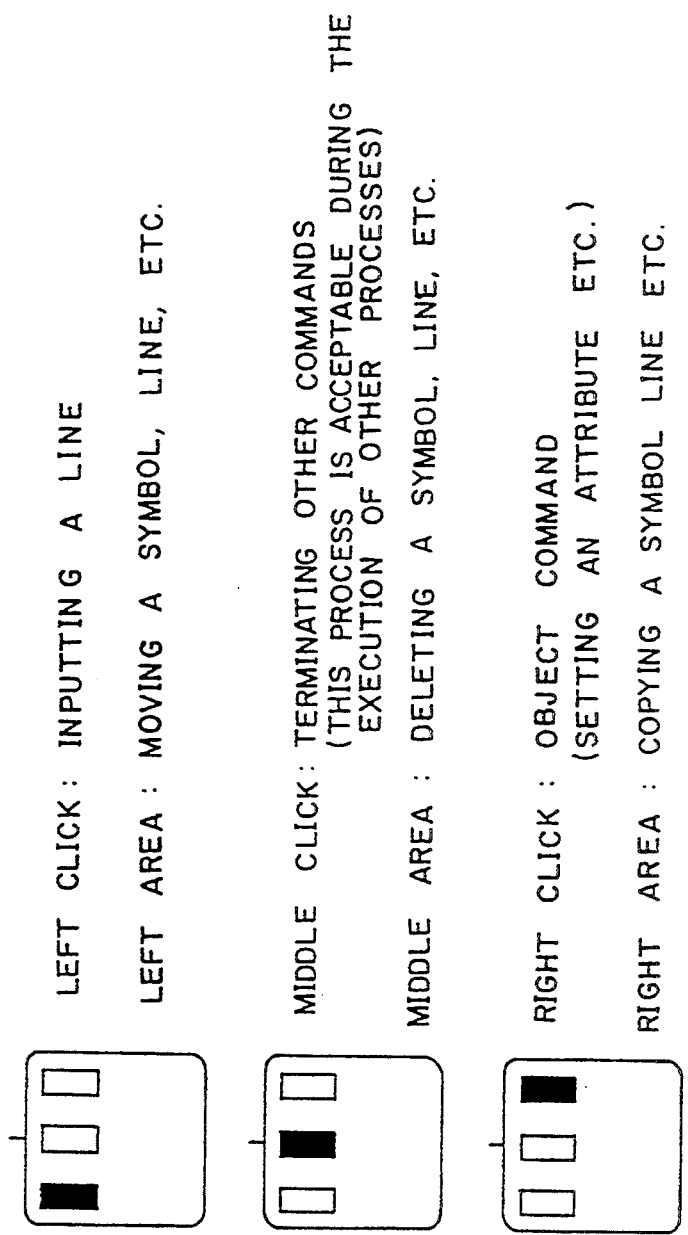
FIG. 4 shows an embodiment of functions assigned to mouse buttons.

FIG. 4 shows an embodiment for executing functions assigned to mouse buttons forming the area specifier 2. As shown in FIG. 4, the mouse has three buttons, and the indicated functions are executed if a user operates a mouse button in the state of waiting for a command. "Clicking" means releasing a button without moving a mouse while the button is depressed. "Area-process" means the above described area specification, that is, moving a mouse with a button depressed and then releasing the button.

Figure 5A:
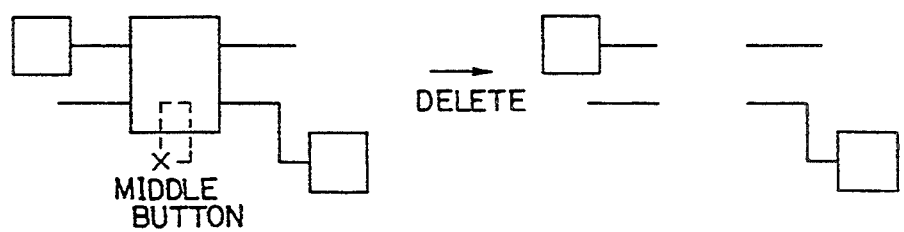
FIGS. 5A to 5C show an embodiment for specifying a variation of a process.
Figure 5B:
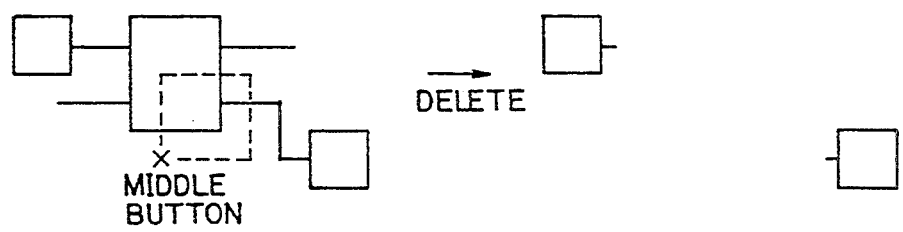
Figure 5C:
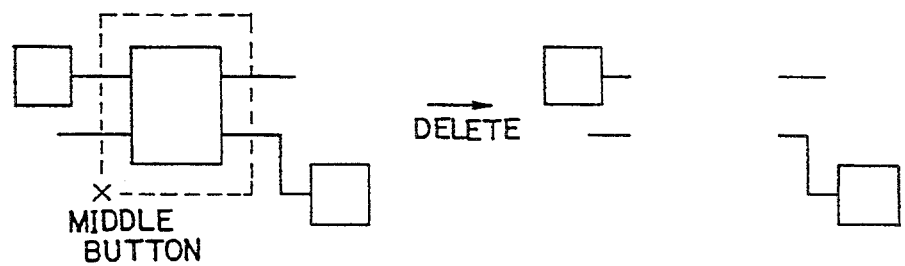

FIGS. 5A to 5C show an embodiment for specifying a variation of the predetermined operation. "A variation of the predetermined operation" means a specification of an area to be processed by the basic editing operation. As shown in FIG. 5A, a part of the boundary of a rectangle indicating a symbol, that is, a logical element, is area-processed, and a deleting operation, for example, is performed only on the symbol. When only a line indicating a signal line is specified, only that line is deleted.

As shown in FIG. 5B, when a symbol and a part of a line connected to it is area-processed using a middle button, a delete process is performed on the symbol and all the lines connected to it. This process typically features the present invention. It does not require separate specification of a logical element and a signal line connected to it, but processes them collectively.

Next, as shown in FIG. 5C, when an area-process using a middle button contains a symbol and crosses only a line, a process, that is, a deletion, is performed on the specified area.

In the present invention, data relating to a symbol and a line are stored as a part of internal circuit data 23 shown in FIG. 3. FIGS. 6A and 6B show an embodiment of symbol tables and line tables for storing data relating to symbols and lines. These tables store exclusive area coordinates of a symbol (rectangular area), an end point and a start point of a line, etc.

Figure 7:
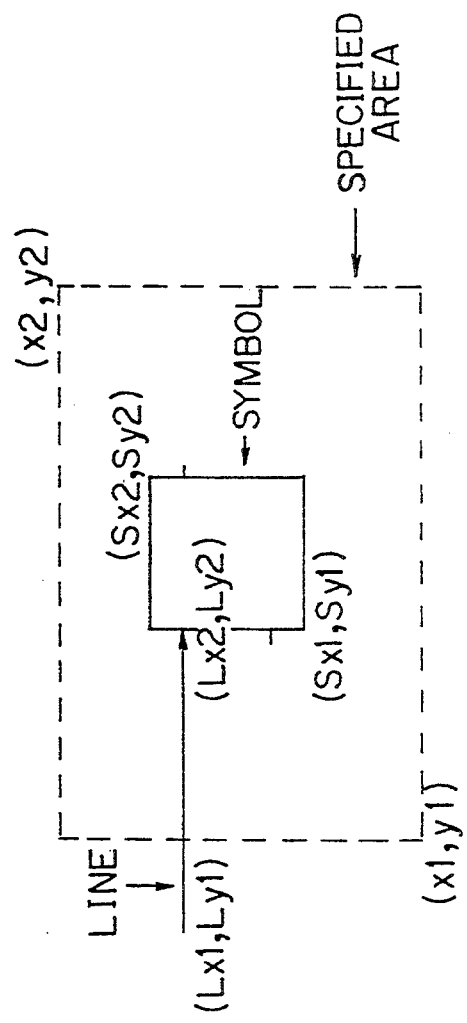
FIG. 7 shows a view for explaining the determination of a symbol and a line.

Determination of a symbol, a line, a crossing symbol, and a crossing line is made by retrieving the table shown in FIGS. 6A and 6B. FIG. 7 shows a view for explaining the determination of a symbol and a line. Determination is made easily as to whether or not a specified area $(x_1, y_1-x_2, y_2)$ contains a symbol $(Sx_1, Sy_1-Sx_2, Sy_2)$, or whether or not a specified area crosses a line $(Lx_1, Ly_1-Lx_2, Ly_2)$.

As it takes a lot of time to determine all the symbols and lines in the table, a graphic pattern is segmented into several rectangles of appropriate size (for example, about 5 cm sides), a table (hush table) is prepared to indicate a table of symbols and lines in each rectangle., and only rectangles in the specified area are retrieved.

Figure 8:
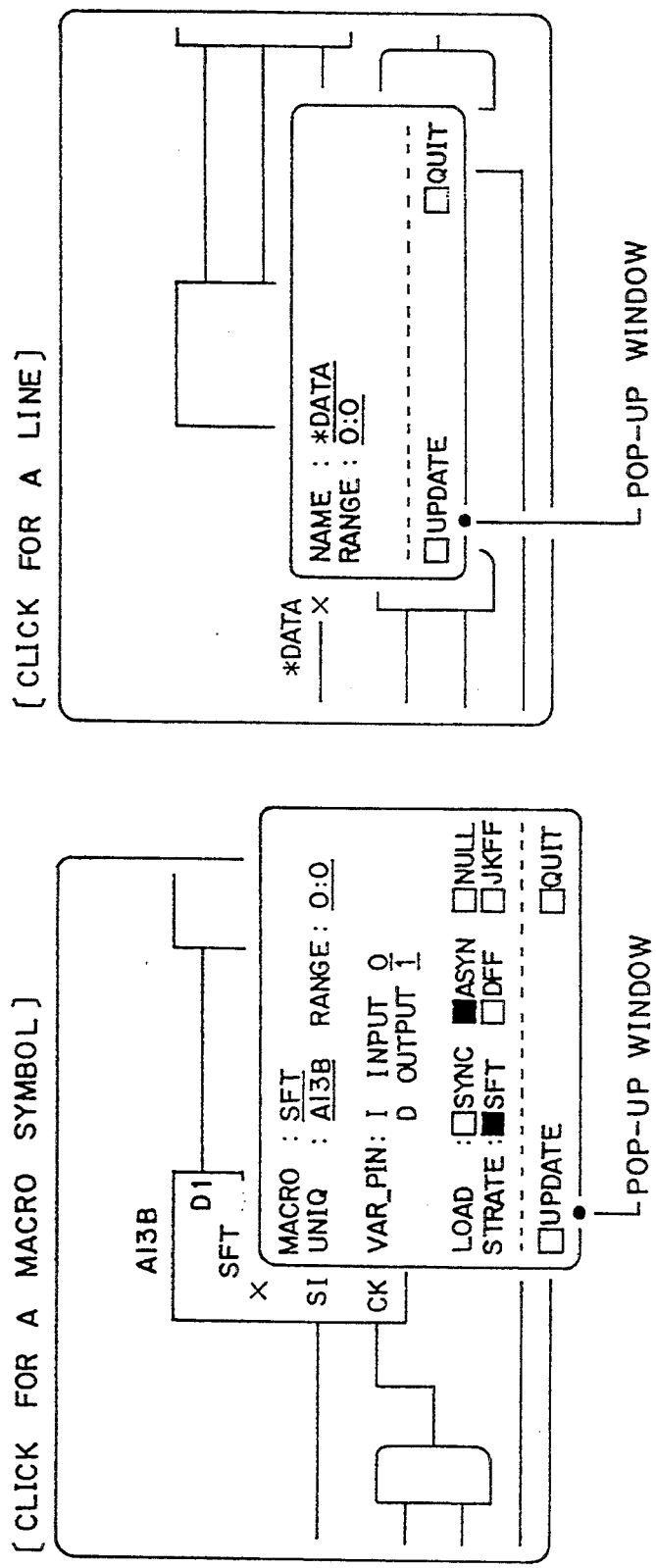
FIG. 8 shows an embodiment for referencing or setting an attribute.

FIG. 8 shows an embodiment for referencing or setting an attribute of a symbol, signal line, etc. In FIG. 8, when a state or an attribute of a macro symbol indicates a logical symbol and a line indicates a signal line is referenced or set, a window for referencing or setting an attribute is popped up on clicking a right button of the mouse for the symbol or the line, that is, in an object to be processed or on the line as shown by the mark x.

FIGS. 9A and 9B show an embodiment for executing the line inputting operation. In FIG. 9A, when a left button is clicked at the point 1, a rubber bandage of a line is indicated as shown by a dotted line and the system is kept in the wait state for an input of an end point or point on the line. As the point 1 also shows the position of a logical element pin, that is, a symbol pin, a start point can be set on the position where no symbol pins or lines exist.

Next, when the left button is clicked at point 2, point 2 is considered a point on the line starting at point 1, because point 2 cannot be a predetermined end point, that is, a position of a pin or a point on another line. The intermediate point is also the starting point of the next line, and the system is kept in the wait state for the input of the start point or an intermediate point.

When the left button is clicked at point 3, this position is considered to be an end point because it is the position of a symbol pin, and the line starting at point 1 is automatically inputted after turning at the intermediate point 2. A middle button should be clicked to terminate the line input with the end of the line kept in the starting state.

When point 1 is inputted as the start point and point 2 is inputted as the end point, as shown in FIG. 9B, a diagonal line is inputted. In the present invention, a diagonal line is assumed to be provided at 45 degrees, having an equal difference in absolute value between the X-Y coordinates of the start point and these of the end point.

Figure 10:
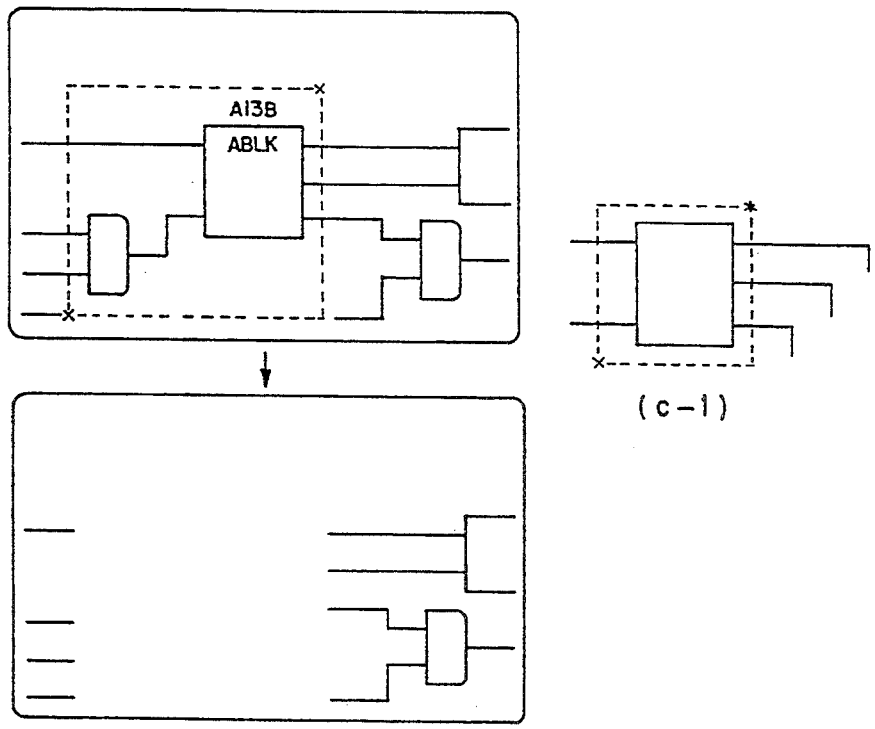
FIGS. 10A to 10F show an embodiment for executing a delete process.
Figure 10:
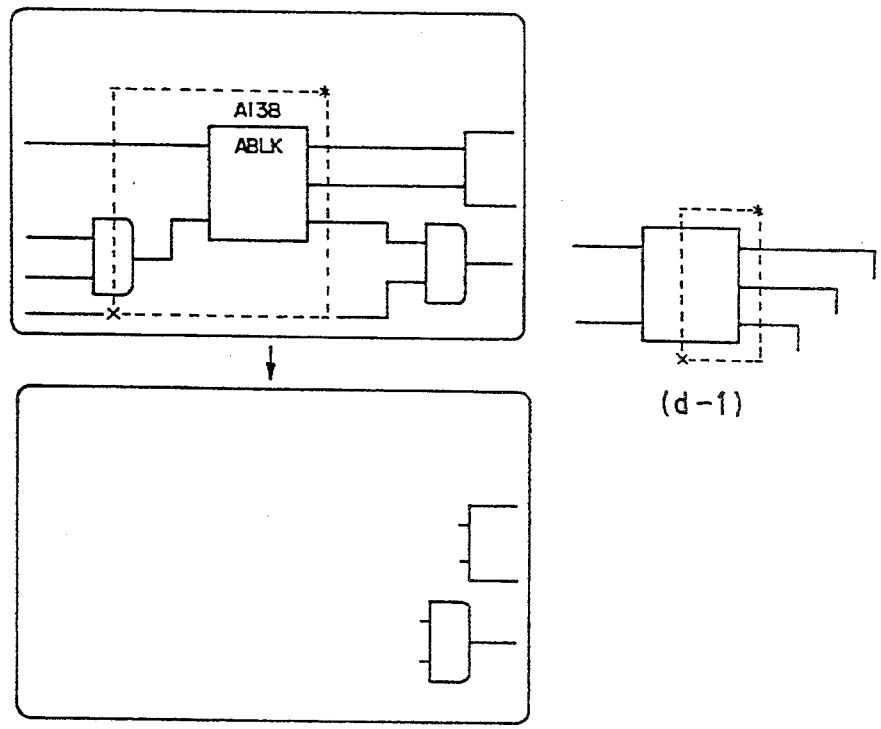

FIGS. 10A to 10F show an embodiment for executing the deleting operation. FIG. 10A shows an example of a deleting on of a symbol where an area-process is performed on a symbol only (excluding a pin) using a middle button, and only a symbol is deleted. Only a specified symbol is deleted from its pin position, and a signal line connected to the symbol is retained as is. An area can be specified as shown in (a-1) of FIG. 10A. Also an area can be specified as shown in (a-2) of FIG. 10A to delete two symbols.

FIG. 10B shows: an embodiment for deleting a symbol and a connection line. When a part of a symbol including one or more connected pins is area-processed using a middle button, the specified symbol and all the signal lines connected to the symbol are deleted. An area can be specified as shown in (b-1) of FIG. 10B. When an area is specified as shown in (b-2) FIG. 10B, two symbols and all the signal lines connected to them are deleted.

FIG. 10C shows an embodiment for deleting a part of a circuit. One or more symbols and signal lines are area-processed using a middle button such that no symbols exist on the boundary of the specified area. Then, all the specified symbol and signal lines in the specified area are deleted. In this case, as described in association with FIG. 5C, a signal line crossing the boundary of a specified area is cut off by the boundary and deleted. An area can be specified as shown in (c-1) of FIG. 10C such that one symbol is contained.

FIG. 10D shows an embodiment for deleting a part of a circuit and a connection line. When one or more symbols and signal lines are area-processed using a middle button such that a symbol exists on the boundary of the specified area, all the symbols and signal lines in the specified area are deleted. In this case, as shown in FIG. 5B, all the signal lines connected to other symbols are deleted, and only pins remain for the other symbols. When an area is specified as shown in (d-1) of FIG. 10D, the result is as shown in FIG. 10B.

FIG. 10E shows an embodiment for deleting a signal line. When a part of the straight portion of a line indicating a signal line is area-processed using a middle button, a line in the specified area, that is, the straight portion of the line is deleted. An area process is performed as shown in (e-1) of FIG. 10E, and two net lines are deleted.

FIG. 10F shows an embodiment for deleting a signal line in a path unit. When an area-process is performed using a middle button such that one or more connection points of two lines are contained, signal lines including those points are deleted in path units (between pins, between, a pin and an intersection, and between intersections). When an area-process is performed as shown in (f-1) of FIG. 10F, two net paths are deleted.

Figure 11A:
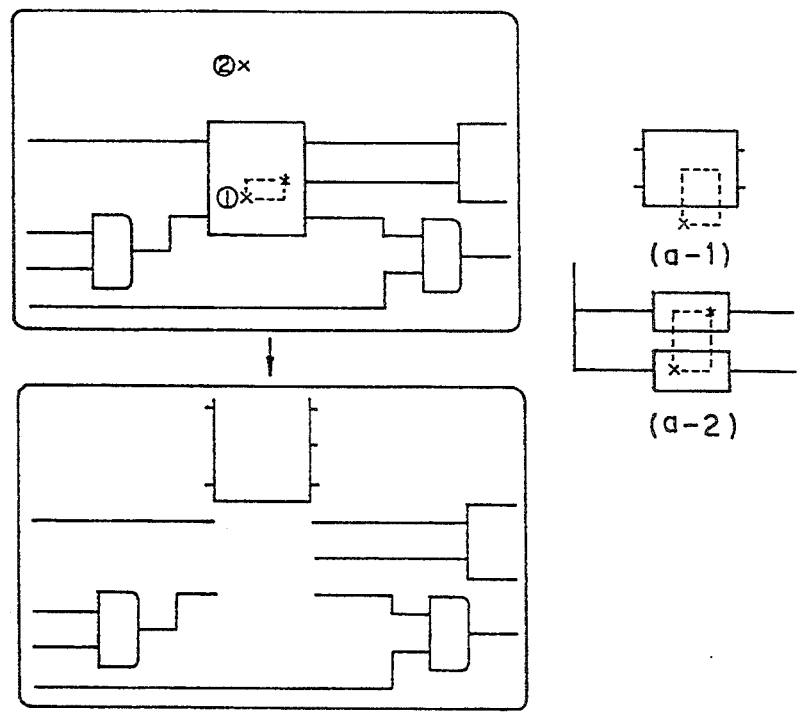
FIGS. 11A to 11D show an embodiment for executing a movement process.

FIGS. 11A to 11D show an embodiment of the moving operation. FIG. 11A shows an example of a movement of a symbol. In this case, only a symbol is area-processed using a left button at the point 1. The left button is clicked at the moved-to point 2. Then, the specified symbol is moved to the specified position, and connected signal lines remain as is. An area can be specified as shown in (a-1) of FIG. 11A. When an area is specified as shown in (a-2) of FIG. 11A, two symbols can be moved.

Figure 11B:
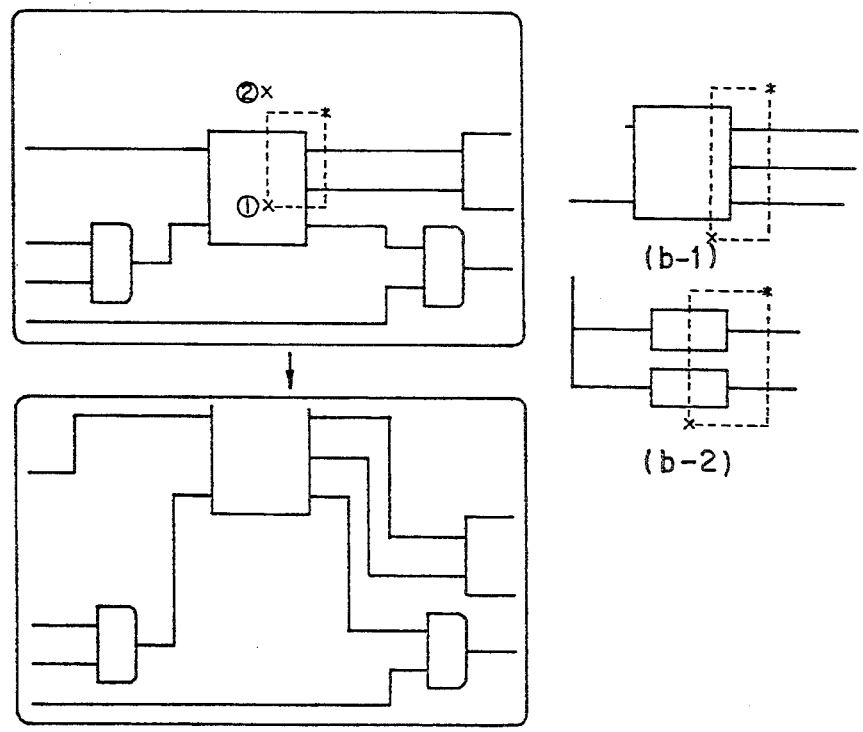

FIG. 11B shows an embodiment for moving symbols and connection lines. An area process is performed using a left button such that one or more pins connected at the point 1 is contained. When the left button is clicked at the point 2 as the moved-to-point, the specified symbols are moved and the connected signal lines are reconnected, thus retaining the connection. An area can be specified as shown in (b-1) of FIG. 11B. When an area is specified as shown in (b-2) of FIG. 11B, two symbols are moved with the connection to them retained.

Figure 11C:
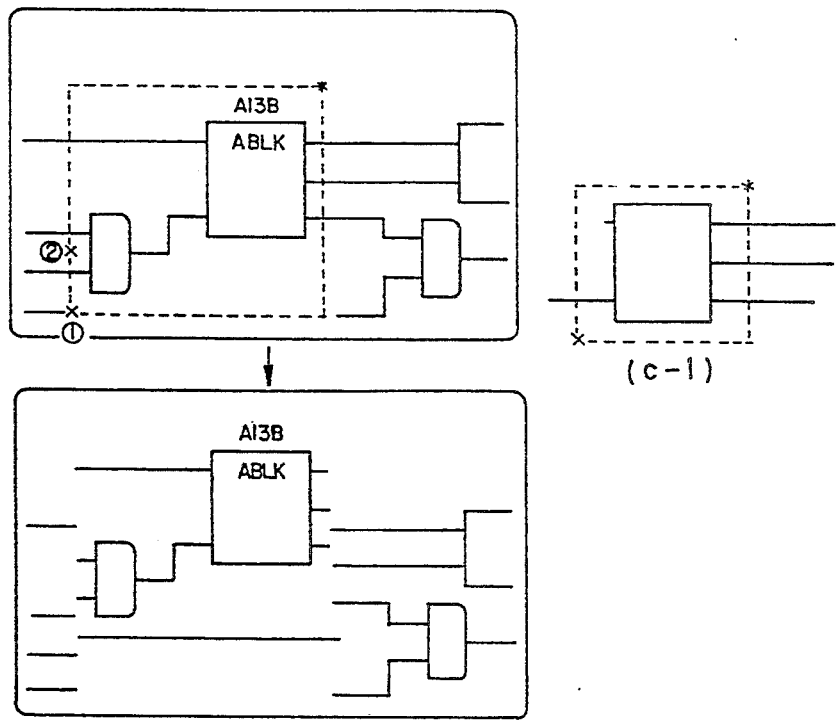

FIG. 11C shows an example a partial movement of a circuit where an area-process is performed on one or more symbols and signal lines at the point 1 such that a symbol does not exist on the boundary of the specified area, When the left button is clicked at the point 2, the specified symbol is moved and the connected signal lines are cut off by the boundary for specifying an area. An area can be specified for only one symbol as shown in (c-1) of FIG. 11C.

Figure 11D:
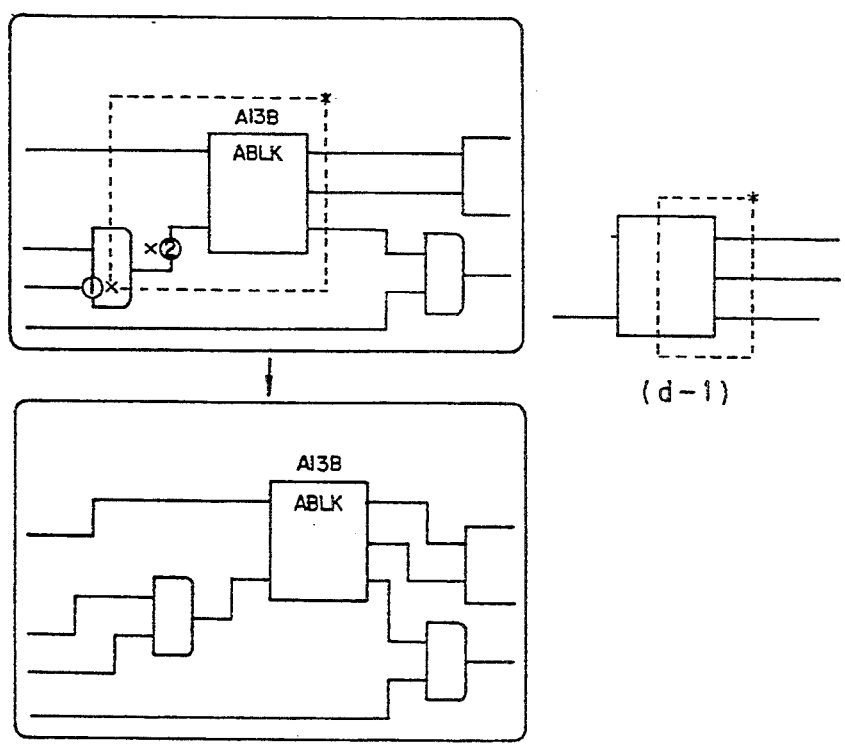

FIG. 11D shows an example of a part of a circuit and of a movement of connection lines.

FIG. 11D is different from FIG. 11C in that an area process is performed such that a symbol exists on the boundary of the specified area. Then, a symbol and a signal line within the boundary are moved, and the signal line is reconnected, thus retaining the connection. An area can be specified for one symbol as shown in (d-1) of FIG. 11D.

Figure 12A:
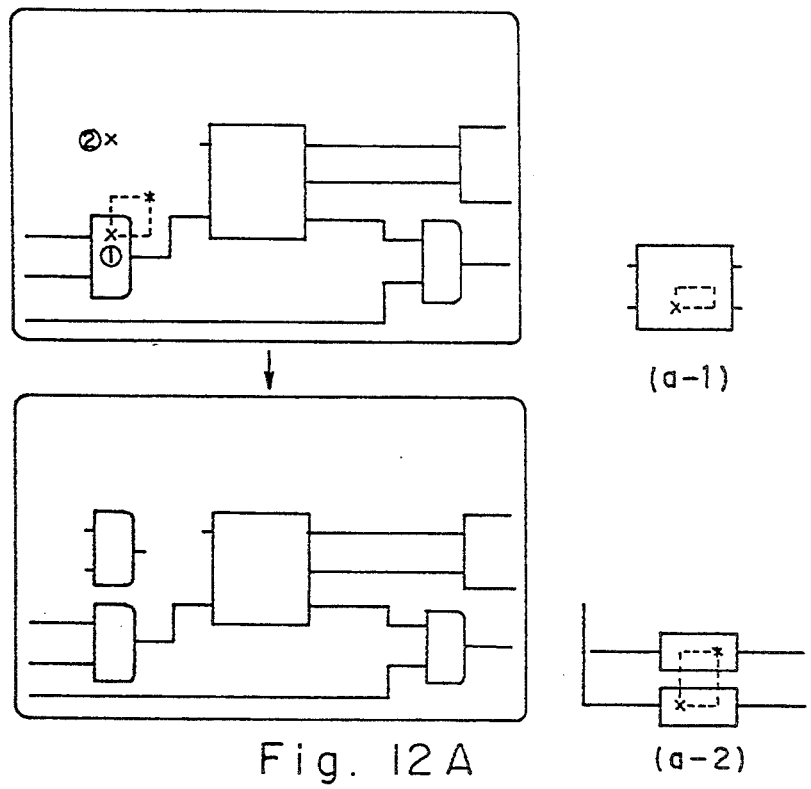
FIGS. 12A to 12C show an embodiment for executing a copying process.

FIG. 12 shows an embodiment of the copying operation. FIG. 12A shows an example of a copying of a symbol where a part of a symbol is area-processed using a right button at the point 1. When the left button is clicked at the moved-to point 2, the specified symbol is copied to the specified position. An area can be specified as shown in (a-1) of FIG. 12A. When an area is specified as shown in (a-2) of FIG. 12A, two symbols are copied.

Figure 12B:
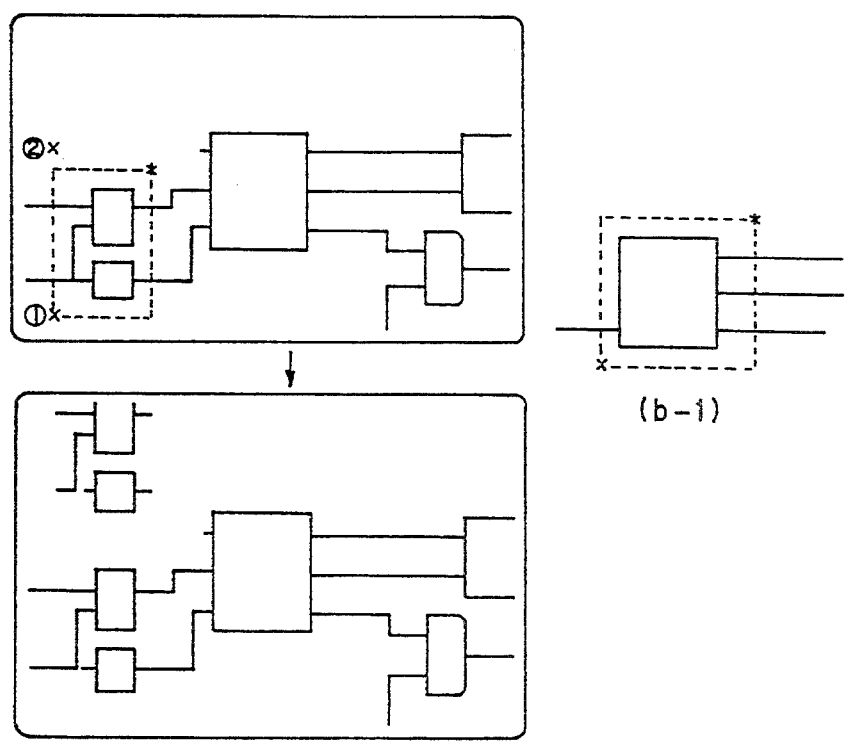

FIG. 12B shows an example of a copying of a part of a circuit including connection lines. An area process is performed for one or more symbols and signal lines using a right button at the point 1 such that a symbol does not exist on the boundary. When a left button is clicked at the moved-to point 2, the specified symbol is moved. The signal lines connected to the symbol are cut off by the boundary and moved. An area can be specified for one symbol as shown in (b-1) of FIG. 12B.

Figure 12C:
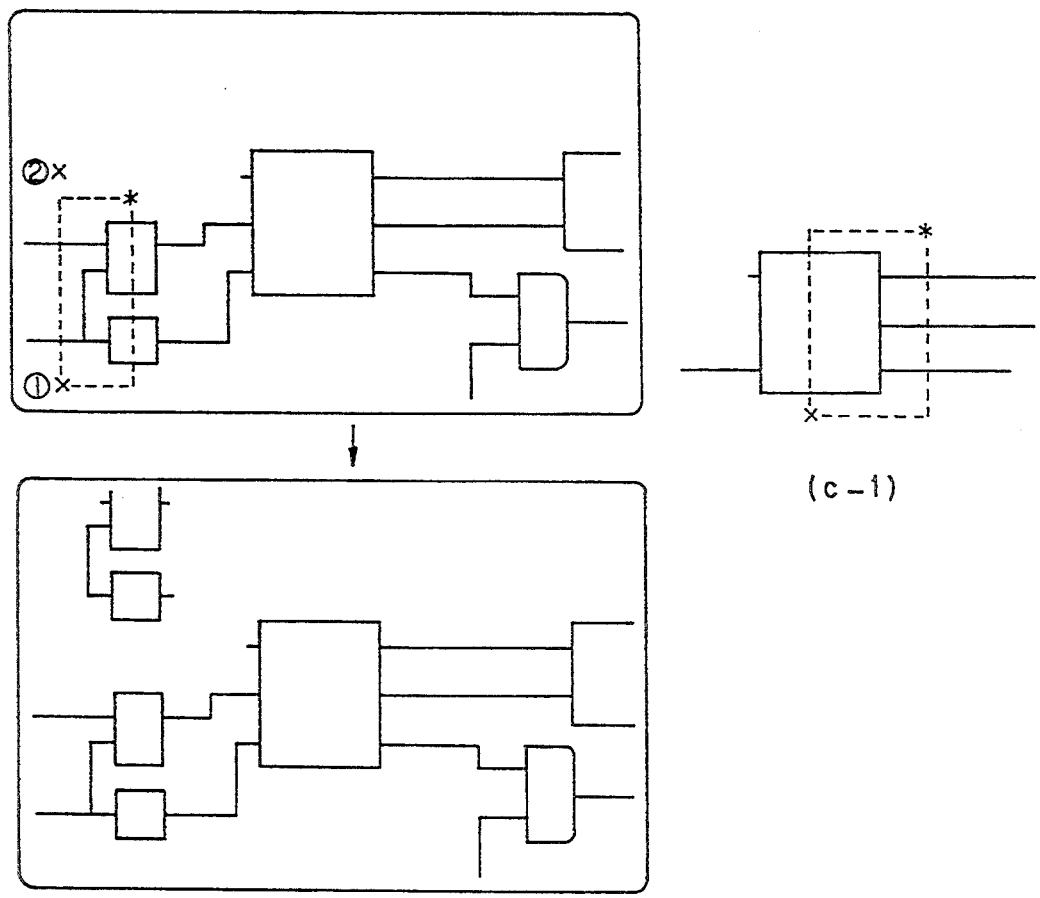

FIG. 12C shows an example of a copying of a part of a circuit with the connection deleted. In FIG. 12C, an area process is performed for one or more symbols and signal lines such that a symbol exists on the boundary within the specified area at the point 1 using a right button. When the left button is clicked at the point 2, the symbol is moved to the specified position. But a signal line connected to the symbol is cut off at the position of a symbol pin. The connection between the specified symbols is retained as is. An area can be specified for one symbol as shown in (c-1) of FIG. 12C.

Figure 13A:
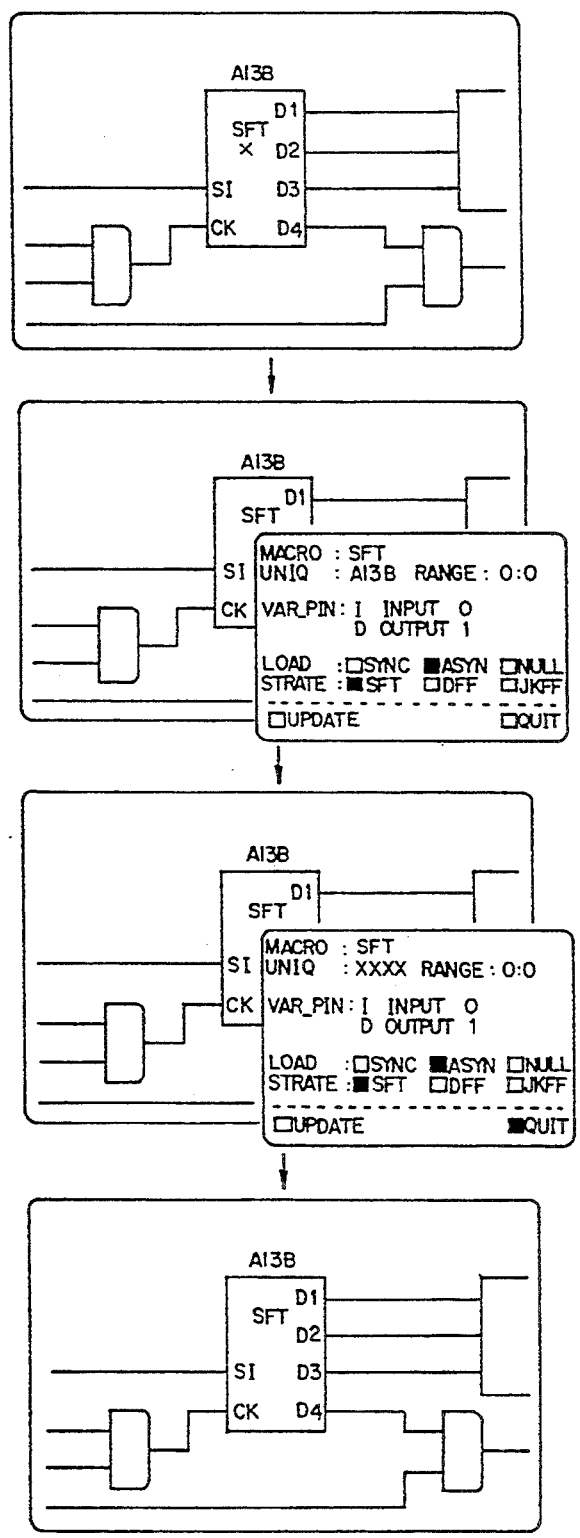
FIGS. 13A to 13C show an embodiment for referencing or setting an attribute.
Figure 13B:
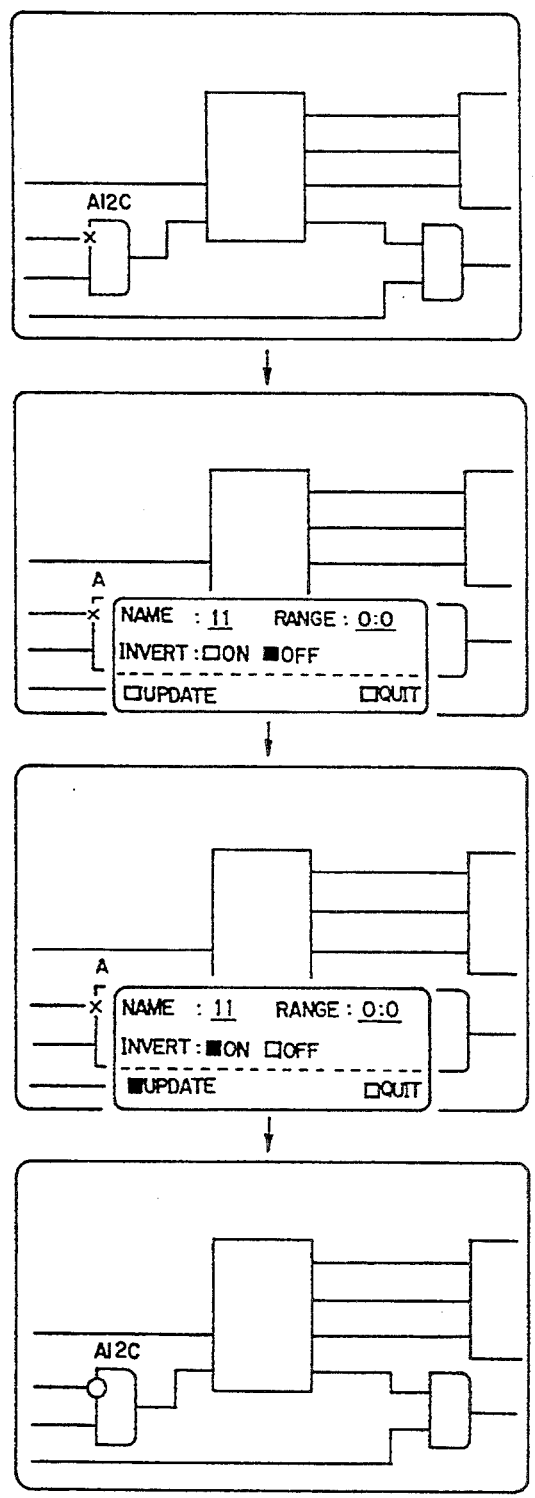
Figure 13C:
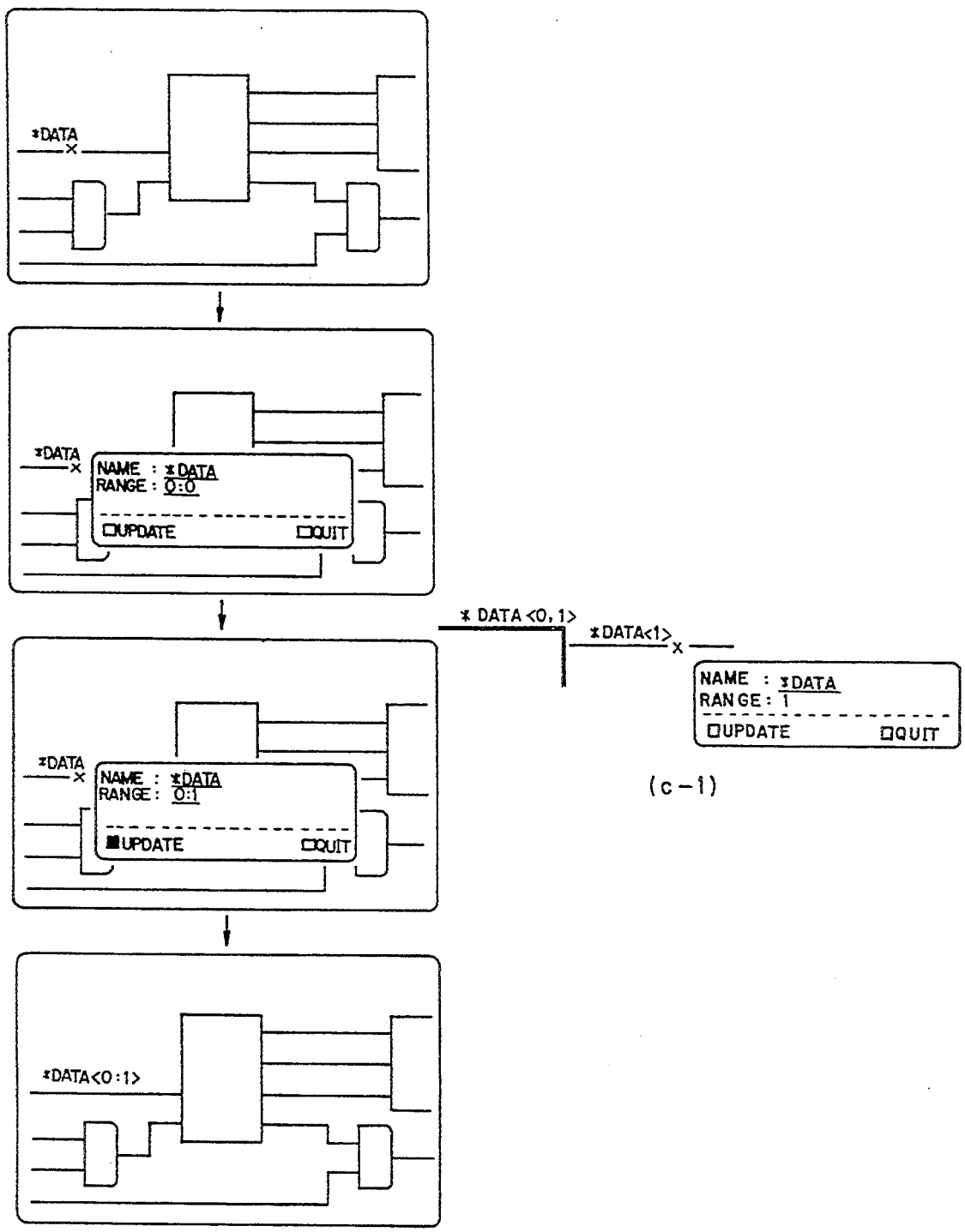

FIGS. 13A to 13C show an embodiment for referencing or setting an attribute. FIG. 13A shows an example of a symbol where a window displaying various attributes of a basic macro symbol is popped up when a right button is clicked at the point of the mark x for the basic macro symbol having the element type name A13B. The window indicates that, for example, the macro (MACRO) is an SFT (a shift register); a UNIQ (an element type name) is A13B, etc. If a click is performed for QUIT assuming that the content of UNIQ is altered to XXXX, the window is closed with the element type name of A13B as the content of UNIQ unchanged without updating for the alteration.

FIG. 13B shows an example of a setting of an attribute of a symbol pin. When a right button is clicked at the position near the symbol pin as shown by the mark x, a window indicating various attributes of the pin is opened., When the window is closed by turning on INVERT to invert the logic of the pin and then clicking for UPDATE, the logic of the pin is inverted. A pin table is provided with a pin like a symbol table and a line table shown in FIG. 6, and each link indicated therein reefers to a pin in association with its symbol, whose element name is also listed.

FIG. 13C shows an example of a setting of an attribute of a signal line (line). When a right button is clicked on a signal line as shown by the mark x, a window indicating various attributes of the signal line is opened. It comprises the name of the signal line (NAME) *DATA and the bit range RANGE 0:0, where 0:0 indicates that the signal line has 1 bit. When a click is performed for UPDATE after changing the bit range of the signal line to 0:1, that is, 2-bit bus, the signal line is indicated after replaced with the 2-bit bus representation. A branch line from a bus can be specified as 1, for example, as a bit range, and then indicated as shown in FIG. 13C-1.

FIG. 14 shows an example of a flowchart of a process embodiment of a basic editing process. In step S40 shown in FIG. 14, a mouse event which includes a user's depressing and releasing a mouse button and moving a mouse, is expected. When an event is issued, the content is determined in S41. Even though a button is depressed, the above described click- and area-processes are not necessarily completed. Then, the position of the mouse when a button is depressed in S42, and a button depressed in S43 are stored, and then control is returned to S40. The processes in S40–S43 can be performed by the mouse event picking unit 21 shown in FIG. 3.

When an event from a mouse is determined as "a button is released" in S41, determination is made in S44 as to whether or not the position of the depressed mouse button practically corresponds to that where the button is released. If it does, the process is determined as a click, and determination is made in S45 as to which button is depressed. When a left button is depressed, a line is inputted in S46. When a right button is depressed, an attribute is referenced or set in S47. Depressing a middle button means that another command terminates as described in association with FIG. 4, and it is acceptable during the execution of other processes. In this case, no actions are taken because no processes are being performed. Then, in S48, the positions of buttons and the mouse are reset, and control is returned to the process in S40.

When, in S44, the position of the mouse does not correspond to that where the button is depressed, the process is determined as an area process, and determination is made in S49 as to which button is depressed, A moving process is performed in S50 when a left button is depressed, a deleting process is performed in S51 when a middle button is depressed, and a copying process is performed in S52 when a right button is depressed. Then, a process in S48 is performed and control is returned to the process in S40.

When an event from a mouse is determined as "a mouse is moved" in S41, determination is made as to whether a mouse button is depressed in S53. When the button is not depressed, a basic editing process is not specified. Therefore, control is returned to the process in S40. When the button is depressed, control is returned to the process in S40 after a rectangular rubber bandage graphic pattern which is used as an indicator in specifying an area is displayed on the screen in S54. The contents of the processes in S44–S54 are determined by the process function analyzer 22 according to the output of the mouse event picking unit 21, and the processes are performed by each of processors from the an attribute referencing/setting unit 24 to the line inputting unit 28.

Figure 15:
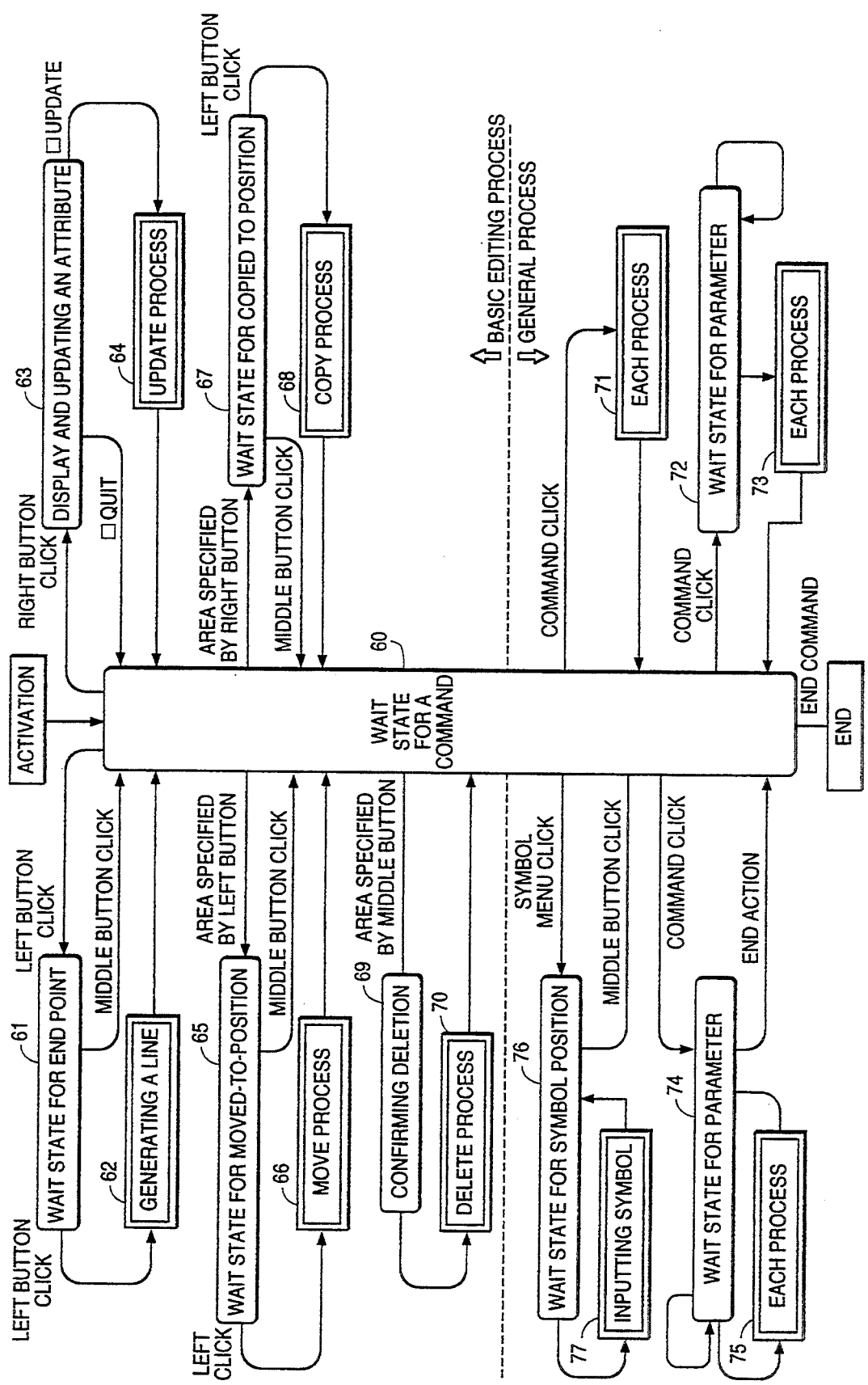
FIG. 15 shows an embodiment for shifting the state of each function.

FIG. 15 shows an embodiment for shifting the state of each function. In FIG. 15, the system enters the wait state for a command at S60 after it is activated. When a left button is clicked, the start point of a line is inputted. Then, the system enters the wait state for the end point. If the left button is clicked again, a line is drawn to the end point in S62. A middle button is clicked to terminate the input of the line with the end point released without inputting the end point.

When a right button is clicked in the wait state for a command in S60, a window indicating an attribute of a symbol or a line on that position is opened. In S63, attributes are displayed or updated. In S64, a click for UPDATE performs an updating process, and the system returns to the wait state for a command. In S63, the system enters the wait state for a command without updating an attribute when a button is clicked for QUIT.

When an area is specified using a left button in S60 in the wait state for a command, the system enters the wait state for a moved-to position in a move process in S65. When the left button is clicked for a moved-to position a moving process is performed in S66, and the system enters the wait state for a command in S60. When a middle button is clicked in the wait state for a moved-to-position in S65, the system enters the wait state for a command in S60.

When an area is specified using a right button in the wait state for a command in S60, the system enters the wait state for a copied-to position in S67. Then, a left button is clicked for a copying process in S68, and the system returns to the wait state for a command in S60. If a middle button is clicked in the wait state for a copied-to position in S67, the system enters the wait state for a command in S60 without performing a copying process.

When an area is specified using a middle button in the wait state for a command in S60, a deleting process is recognized in S69 and performed in S70, and the system returns to the wait state for a command in S60.

The above described shift of the state is associated with basic editing processes, but other general processes such as the shift of the state of a check command are indicated as unconnected as shown in FIG. 15. A command click includes: performing each process 71 directly, performing each process 73 after the wait state for a parameter in S72, and returning to the wait state for a command by an end action after re-entering the wait state for a command in S74 after proceeding to each process S75 from the wait state for a parameter in S74. Upon a symbol menu click, the system enters the wait state for a symbol position in S76, a symbol is inputted in S77, and the system returns to the wait state for a command in S60 after the middle button is clicked.

Figure 16:
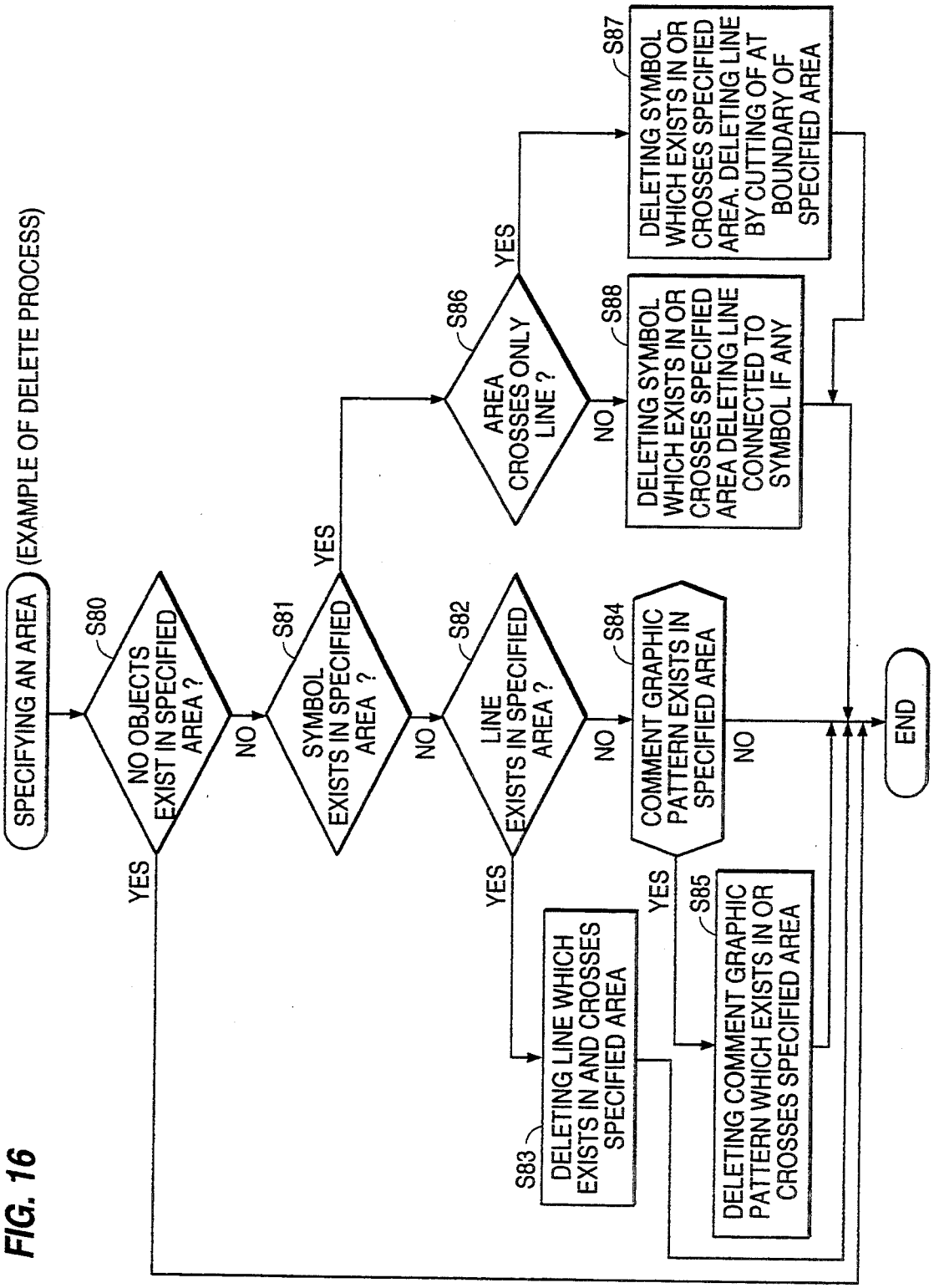
FIG. 16 shows a flowchart of an embodiment for determining a variation of a process.

FIG. 16 shows a flowchart of an embodiment for determining a variation of a process. FIG. 16 shows an example of a deleting process. In S80, determination is made as to whether or not an object exists to be processed in a specified area. If not, the process terminates immediately. If yes, determination is made in S81 as to whether or not a symbol exists in the specified area. If not, determination is made in S82 as to whether or not a line exists in the specified area. If yes, a line contained in or crossing the specified area is deleted in S83, and the process terminates.

When the determination says no lines exist in the specified area in S82, determination is made as to whether or not any object to be deleted exists in the specified area except a symbol or a line. If yes, it is deleted. For example, when a comment graphic pattern is an object to be deleted, determination is made in S84 as to whether or not a comment graphic pattern exists. If yes, the comment graphic pattern is deleted in S85, and the process terminates. A comment graphic pattern comprises a comment graphic pattern and character data. Thus, in a logical drawing, some notes can be described irrelevant to the logic. Therefore, the editor of the present invention is provided with editing functions to edit them.

When a symbol is detected within the specified area in S81, determination is made in S86 as to whether or not the specified area crosses only a line. If yes, the symbol in the specified area is deleted in S87 as described in association with FIG. 10C, the line is simultaneously cut off at the boundary, and then the process terminates. When the specified area crosses not only a line but also a symbol, all symbols are deleted as described in association with FIG. 10D, and all lines are simultaneously deleted up to the position of an input pin of other symbols. The contents of the process shown in FIG. 16 are determined by the process function analyzer 22 and performed by the deleting unit 27.

Figure 17:
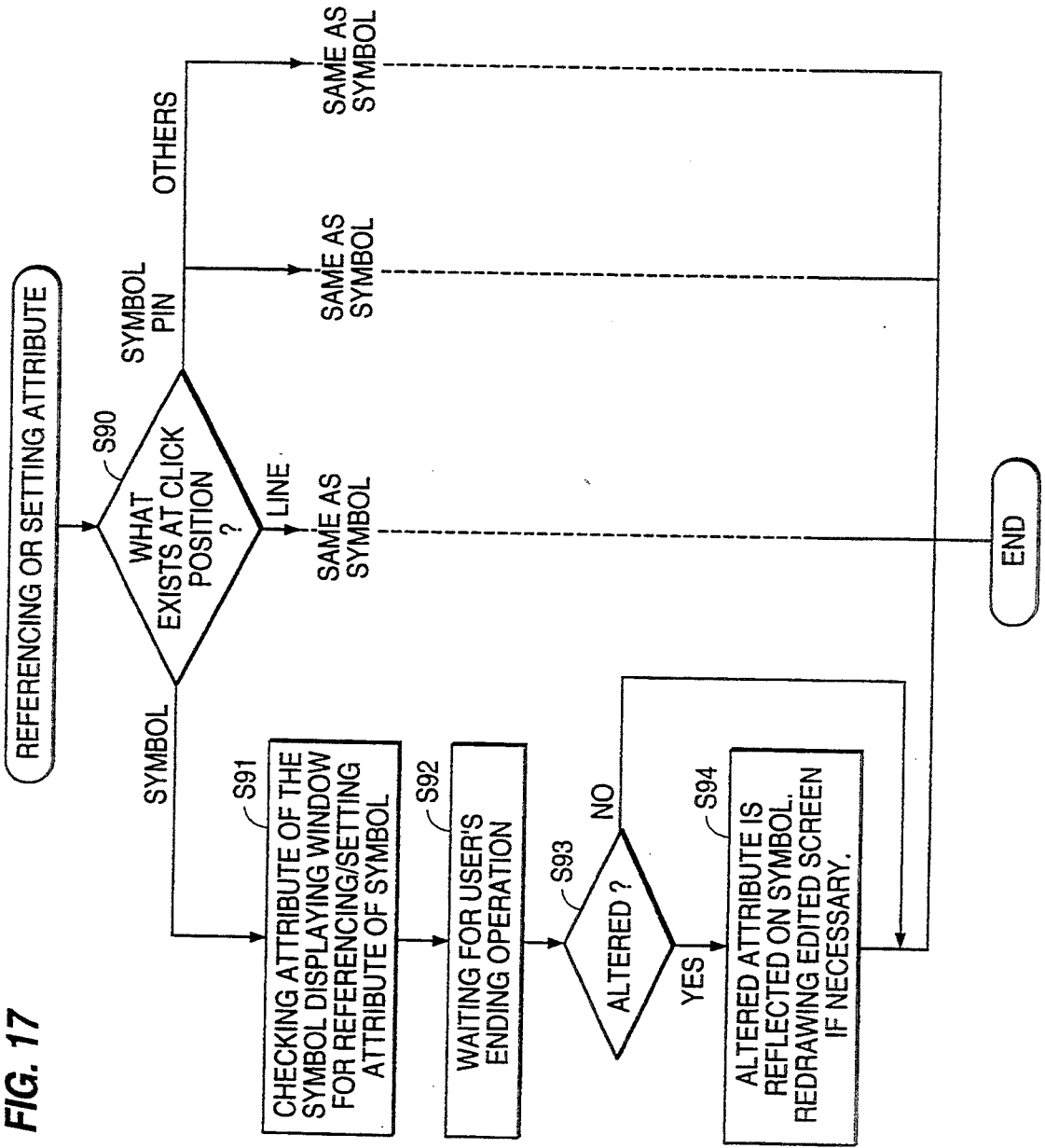
FIG. 17 shows a flowchart of an embodiment for referencing or setting an attribute.

FIG. 17 shows a flowchart of an embodiment for referencing or setting an attribute. In FIG. 17, determination is made in S90 as to what exists at the position where a button is clicked. When it is a symbol, an attribute of the symbol is checked in S91, and a window for referencing or setting an attribute is displayed. The system waits for the termination of the user's operation in S92. Determination is made in S93 as to whether or not an attribute is altered. If yes, the altered attribute is reflected on a symbol in S94, and a drawing to be edited is re-drawn if necessary. If the attribute is not altered, the process terminates without performing any action. When a line, a symbol pin, or any other element except symbol exists at the position where a button is clicked in S90, the processes relating to a symbol are performed in S91–S94. The contents of the above described processes are determined by the process function analyzer 22 and performed by the attribute referencer/setter 24.

As described in detail above, the present invention realizes a user interface for selecting a function and an object to be processed simultaneously in the basic editing operation in a system for editing a logical diagram using a graphic display, enabling a designing operation without interrupting the logical design flow. A variation of a function can also be selected while selecting an object to be processed. Thus, the number of required steps can be reduced, improving the efficiency of the whole operation. Furthermore, in the attribute referencing/setting process, an exclusive window is opened by selecting an object to be processed, thus simplifying a user's operation by eliminating the trouble of memorizing an attribute for each object. Accordingly, a graphic editor of the present invention can be used as an efficient designing tool having higher performance than the prior art technology.

A graphic editor of the present invention can be utilized in any system for editing a graphic pattern on a display screen such as in a CAD system, a logical graphic editing system, etc.

What is claimed is:

1. A graphic editor in a graphic editing system for editing graphic patterns shown on a display screen, comprising:

area specifying means for specifying an area on said display screen; and graphic operating means for determining an existence of a graphic pattern or a line within said area specified by said area specifying means, for selecting one of a plurality of predetermined methods of determining objects to be processed according to an inclusion correlation between said specified area and said graphic pattern or said line, and then for performing, according to said selected method, a specified operation on said graphic pattern or said line within and without said specified area or on a boundary of said specified area.

2. A graphic editor according to claim 1, wherein said area specifying means comprises a mouse.

3. A graphic editor in a graphic editing system for editing graphic patterns shown on a display screen, comprising:

area specifying means for specifying an area on said display screen; and graphic operating means for determining an existence of a graphic pattern or a line within said area specified by said area specifying means, for selecting one of a plurality of predetermined methods of determining objects to be processed according to an inclusion correlation between said specified area and said graphic pattern or said line, and then for performing, according to said selected method, a specified operation on said graphic pattern or said line in said specified area or on a boundary of said specified area in order to edit a logical drawing indicating an arrangement and a connection of logical elements.

4. A graphic editor in a graphic editing system for editing graphic patterns shown on a display screen, comprising:

area specifying means for specifying an area as a rectangle having a diagonal line with its start and end points specified as start and end points of said specified area on said display screen; and graphic operating means for determining an existence of a graphic pattern or a line within said area specified by said area specifying means, for selecting one of a plurality of predetermined methods of determining objects to be processed according to an inclusion correlation between said specified area and said graphic pattern or said line, and then for performing, according to said selected method, a specified operation only on said graphic pattern or said line when said area specified by said area specifying means includes only an internal part or a boundary of said graphic pattern or said line, for performing a specified operation on said graphic pattern and all lines connected to said graphic pattern when said specified area includes said boundary of said graphic pattern and a part of lines connected to said graphic pattern, and for performing a specified operation within said specified area when said area includes one or more graphic patterns and crosses one or more lines only.

5. A graphic editor according to claim 4, wherein said area specifying means comprises a mouse.

6. A graphic editor according to claim 5, wherein said graphic operating means performs said specified operation including deleting, moving, or copying operations using a plurality of corresponding buttons provided on said mouse.

7. A graphic editor according to claim 5, wherein a drawing edited by said graphic editor is a logical drawing indicating an arrangement and a connection of logical elements.

8. A graphic editor in a graphic editing system for editing graphic patterns shown on a display screen, comprising:

area specifying means for specifying an area on said display screen, including a plurality of buttons corresponding to several kinds of said specified operation; and graphic operating means for determining an existence of a graphic pattern or a line within said area specified by said area specifying means, for selecting one of a plurality of predetermined methods of determining objects to be processed according to an inclusion correlation between said specified area and said graphic pattern or said line, and then for performing, according to said selected method, a specified operation on said graphic pattern or said line in said specified area or on a boundary of said specified area, for determining a user's button-clicking operation where one of said plurality of buttons is depressed and then released without shifting a displayed position on said display screen, and for performing a predetermined process corresponding to said one button.

9. A graphic editor according to claim 8, wherein said predetermined process corresponding to said one of said plurality of buttons is a function popped up to a window for displaying an attribute of said graphic pattern or said line;

said window for displaying said attribute of said graphic pattern or said line located at a predetermined display position on said display screen is opened by said click operation; and said attribute in said window can be referred to or set.

10. A graphic editor in a graphic editing system for editing graphic patterns shown on a display screen, comprising:

area specifying means for specifying an area on said display screen, including a plurality of buttons corresponding to several kinds of said specified operation;

graphic operating means for determining an existence of a graphic pattern or a line within said area specified by said area specifying means, for selecting one of a plurality of predetermined methods of determining objects to be processed according to an inclusion correlation between said specified area and said graphic pattern or said line, and then for performing, according to said selected method, a specified operation on said graphic pattern or said line in said specified area or on a boundary of said specified area, for determining a user's area specifying operation where one of a plurality of said buttons is depressed and then released after shifting said displayed position, and for performing a predetermined operation corresponding to said one button on said specified area.

11. A graphic editor according to claim 10, wherein said predetermined operation is performed on a symbol or a line when said area specified by said area specifying operation crosses only an internal part or a boundary of a symbol corresponding to said graphic pattern indicating a logical element, or crosses only a line indicating a signal line;

said predetermined operation is performed on a symbol which is totally or partially contained in the specified area and all lines connected to said symbol when said specified area includes the boundary of said symbol and a part of a line connected to said symbol; and said predetermined operation is performed on said specified area when said specified area includes one or more symbols and crosses one or more lines.

12. A graphic editor in a graphic editing system for editing graphic patterns shown on a display screen, comprising:

area specifying means for specifying an area on said display screen, including a mouse;

graphic operating means for determining an existence of a graphic pattern or a line within said area specified by said area specifying means, for selecting one of a plurality of predetermined methods of determining objects to be processed according to an inclusion correlation between said specified area and said graphic pattern or said line, and then for performing, according to said selected method, a specified operation on said graphic pattern or said line in said specified area or on a boundary of said specified area, said graphic operating means including a mouse event picking part for picking as an event a user's operation result of said mouse and a process function analyzing part for determining a process to be performed on said graphic pattern or said line according to an output of said mouse event picking part.

13. A graphic editor according to claim 12, wherein said graphic operating means performs said specified operation including a deleting, moving, or copying operation each corresponding to one of a plurality of said mouse buttons.

14. A graphic editor according to claim 13, wherein said mouse event picking part waits for said event from said mouse;

said mouse event picking part stores information of a depressed button and its corresponding position and again waits for a next event from said mouse when a received event says "a button is depressed";

when a received event says "a button is released", said process function analyzing part determines whether or not the depressed position of said button shows the same position as the released position;

said process function analyzing part performs a line inputting process or an attribute referencing/setting process in response to said button depressed as said click operation when said positions match; and when said positions do not match, said deleting, moving, or copying operation is performed according to said depressed button.

* * * * *